(12) United States Patent  (10) Patent No.: US 8,105,036 B2
Munch  (45) Date of Patent: Jan. 31, 2012

(54) DEVICE FOR THE ADJUSTMENT OF THE PITCH OF A ROTOR BLADE OF A WIND TURBINE

(75) Inventor: Jesper Munch, Vejle (DK)

(73) Assignee: Siemens Aktiengesellschaft, Munich (DE)

( * ) Notice: Subject to any disclaimer, the term of this patent is extended or adjusted under 35 U.S.C. 154(b) by 923 days.

(21) Appl. No.: 12/154,309

(22) Filed: May 22, 2008

(65) Prior Publication Data

US 2008/0292463 A1 Nov. 27, 2008

(30) Foreign Application Priority Data

May 25, 2007 (EP) .................................. 07010505

(51) Int. Cl.
*B64C 11/42* (2006.01)
(52) U.S. Cl. ........................ 416/156; 415/229
(58) Field of Classification Search .................. 416/155, 416/156; 415/229
See application file for complete search history.

(56) References Cited

U.S. PATENT DOCUMENTS

| 4,201,514 | A | * | 5/1980 | Huetter ............................ 416/37 |
| 4,352,629 | A | | 10/1982 | Cheney, Jr. |
| 4,363,241 | A | | 12/1982 | Egolf |
| 4,431,375 | A | | 2/1984 | Carter, Jr. et al. |
| 4,545,728 | A | | 10/1985 | Cheney, Jr. |
| 5,028,210 | A | * | 7/1991 | Peterson et al. .............. 416/164 |
| 6,327,957 | B1 | | 12/2001 | Carter, Sr. |
| 6,465,901 | B2 | * | 10/2002 | Croes ............................. 290/55 |
| 6,981,844 | B2 | * | 1/2006 | Perkinson et al. ................ 416/1 |
| 7,905,707 | B2 | * | 3/2011 | Numajiri et al. .............. 416/155 |

FOREIGN PATENT DOCUMENTS

DE 2715584 A1 10/1978

* cited by examiner

*Primary Examiner* — Edward Look
*Assistant Examiner* — Andrew C Knopp

(57) ABSTRACT

A device is provided for the adjustment of the pitch of a rotor blade of a wind turbine comprising a pitch actuator acting on an adjusting plane for the adjustment of the pitch and a fixing device to which the pitch actuator is attached, the fixing device comprises a first and a second bearing shaft allowing a pendulum motion of the pitch actuator wherein both the first and the second bearing shaft are arranged respectively under a certain tilt angle relatively to the adjusting plane which tilt angle is respectively substantially different from 0° or 90°.

11 Claims, 4 Drawing Sheets

DEVICE FOR THE ADJUSTMENT OF THE PITCH OF A ROTOR BLADE OF A WIND TURBINE

CROSS REFERENCE TO RELATED APPLICATIONS

This application claims priority of European Patent Office application No. 07010505.1 EP filed May 25, 2007, which is incorporated by reference herein in its entirety.

FIELD OF INVENTION

The invention relates to a device for the adjustment of the pitch of a rotor blade of a wind turbine.

BACKGROUND OF INVENTION

A wind turbine comprises two, three or more rotor blades arranged at a hub. A rotor blade is as a rule adjustable relatively to the hub wherein the so called pitch of the rotor blade is adjusted. With the adjustment of the pitch of the rotor blades e.g. the operation of the wind turbine can be influenced and controlled.

In U.S. Pat. No. 4,352,629, DE 27 15 584 A1, U.S. Pat. Nos. 4,363,241, 4,431,375 and 4,545,728 wind turbines are disclosed each comprising a pitch mechanisms wherein subject to the impact of the wind to the rotor blades and thus to the respective pitch mechanism the pitch of a rotor blade of the wind turbine is altered in particular to avoid an overspeed of the rotor.

For the adjustment of the pitch of a rotor blade in some wind turbines a hydraulic pitch cylinder is used.

In U.S. Pat. No. 6,327,957 B1 a wind turbine is disclosed comprising a wind turbine rotor with oppositely disposed flexible blades attached to the hub of a drive shaft by a flexible spar. The blades are pitched to a stall position by a collective pitch mechanism in the absence of proper operating conditions. The pitch mechanism is used to change the pitch of the blades collectively. The pitch mechanism comprises a pitch beam extending transversely of the axis of the drive shaft and having a shaft portion that reciprocates within the hollow portion of the drive shaft. Opposite ends of the pitch beam are coupled to respective blade root-ribs by linkages. Movement of the pitch beam inwardly of the drive shaft is provided by a hydraulic cylinder pitch actuator on a pitch yoke attached to the hub. Opposite movement of the pitch beam, outwardly of the drive shaft, is provided by a strong compression spring at the innermost end of the shaft portion of the-pitch beam. To pitch the blades to the run position, the hydraulic cylinder of the pitch actuator is charged from a hydraulic fluid supply to move the pitch beam inwardly of the drive shaft, so that wind in the downwind direction drives the rotor. To pitch the blades to the stall position, the hydraulic pressure in the cylinder is released, and the strong compression spring drives the pitch beam outwardly of the drive shaft. A thin mechanical tube guides the shaft portion of the pitch beam inside the drive shaft and positions the powerful coil spring against the end of the shaft portion of the pitch beam to permit pre-loading of the blade pitch system. In a shut-down mode, the blades are held in the stalled position by the spring force.

In another wind turbine the hydraulic pitch cylinder comprises a piston rod movable in a tube of the hydraulic pitch cylinder and acts on an adjusting plane e.g. in form of a rotatable plate connected with the rotor blade. E.g. the piston rod is connected to the rotatable plate and the hydraulic pitch cylinder tube is fastened at a support which is fastened at the hub. Thus when the piston rod is hydraulically moved along the hydraulic pitch cylinder tube the pitch of the corresponding rotor blade is adjusted.

SUMMARY OF INVENTION

As a rule the support of the hydraulic pitch cylinder comprises two cylindrical bearings which define a first bearing shaft. The first bearing shaft is arranged perpendicularly relatively to the adjusting plane or the rotatable plate. Thus the hydraulic pitch cylinder can pivot around the first bearing shaft during the adjustment of the pitch. This is necessary since the linear movement of the piston rod is converted in a circular movement of the rotatable plate. Often there is a small additional pivoting around a second bearing shaft. The second bearing shaft is perpendicular to the first bearing shaft, substantially perpendicular to the hydraulic pitch cylinder and parallel to the adjusting plane or the rotatable plate. The two bearings assigned to the second bearing shaft are also cylindrical bearings. Because of the only small pivoting around the second bearing shaft there is a high risk of so called standstill marks in the bearings of the second bearing shaft caused by loads on the bearings without any rotation of the bearings. Thus there is a high risk of a deadlock preventing a pivoting of the hydraulic pitch cylinder around the second bearing shaft.

It is therefore an object of the present invention to provide a device as initially mentioned in such a way, that the pivoting of the pitch actuator is preferably not hindered.

This object is inventively achieved by a device for the adjustment of the pitch of a rotor blade of a wind turbine comprising a pitch actuator in form of hydraulic pitch cylinder or an electric pitch actuator acting on an adjusting plane for the adjustment of the pitch and a fixing device to which the pitch actuator is attached, and which is provided for an attachment to a hub of a wind turbine, the fixing device comprises a first and a second bearing shaft allowing a pendulum motion of the pitch actuator relatively to the fixing device wherein both the first and the second bearing shaft are arranged respectively under a certain tilt angle relatively to the adjusting plane which tilt angle is respectively substantially different from 0° or 90°. By tilting the first and the second bearing shaft relatively to the adjusting plane the angular or circular rotation is divided on both bearing shafts. Thus an angular or circular rotation around substantially only one bearing shaft, the first or the second bearing shaft, during the adjustment of the pitch can be avoided. Thereby also the occurrence of standstill marks in bearings can be avoided and the pivoting of the pitch actuator around the first and the second bearing shaft is not hindered. The fixing device has thereby the operation of a pendulum bearing support of the pitch actuator.

According to an embodiment of the invention the first and the second bearing shaft are arranged substantially perpendicularly relatively to each other.

According to another embodiment of the invention the first and the second bearing shaft are arranged substantially in a common plane.

According to a variant of the invention the first and/or the second bearing shaft are arranged substantially under a tilt angle within the range of +10° to +80° or −10° to −80° relatively to the adjusting plane. Thus the tilt angle of each bearing shaft can be chosen as desired or required. Depending on the chosen tilt angles for the first and the second bearing shaft relatively to the adjusting plane the angular or circular rotation can be divided on the bearing shafts.

In a further development of the invention the first bearing shaft is arranged substantially under a −45° tilt angle relatively to the adjusting plane and the second bearing shaft is arranged substantially under a +45° tilt angle relatively to the adjusting plane. In this case the angular or the circular rotation is divided equally on both bearing shafts.

Preferably at least two bearings are assigned to the first bearing shaft wherein the two bearings of the first bearing shaft are attached to a first ring-like element of the fixing device. The first ring-like element is a kind of support ring for the pitch actuator comprising two projecting parts facing each other. At each projecting part a bearing is arranged.

According to a further development of the invention at least two bearings are assigned to the second bearing shaft wherein the two bearings of the second bearing shaft are attached to a third ring-like element of the fixing device connected respectively to a bearing part of the bearings of the first bearing shaft.

According to an embodiment of the invention at least one bearing is a plain bearing. Preferably all bearings assigned to the first or the second bearing shaft are plain bearings which can support both axial and radial loads from the hydraulic pitch cylinder.

As a rule the fixing device comprises one or more fixing means e.g. in form of flanges comprising clearance holes for fastening the fixing device and thus the pitch actuator at the hub.

BRIEF DESCRIPTION OF THE DRAWINGS

The invention will in the following be explained in more detail with reference to the schematic drawings, where.

DETAILED DESCRIPTION OF INVENTION

Figure 1:
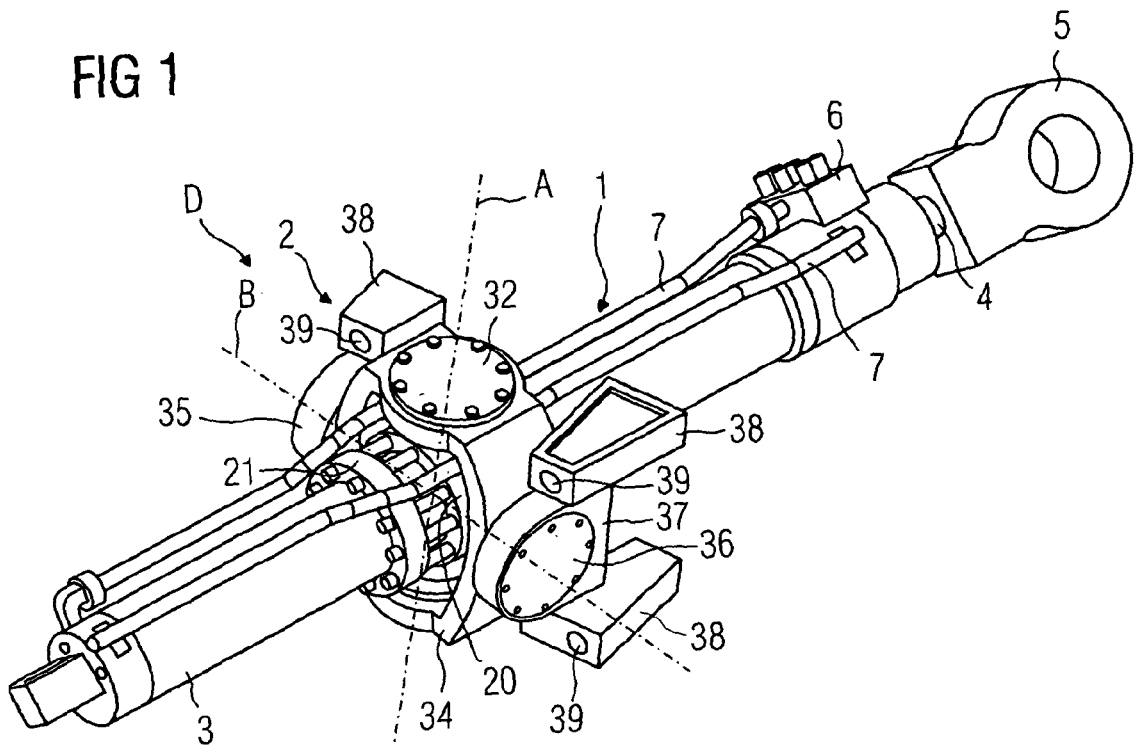
FIG. 1 shows a device for the adjustment of the pitch of a rotor blade of a wind turbine in a perspective view.

FIG. 1 shows a device D for the adjustment of the pitch of a rotor blade of a wind turbine comprising a pitch actuator in form of a hydraulic pitch cylinder 1 and a fixing device 2.

Figure 2:
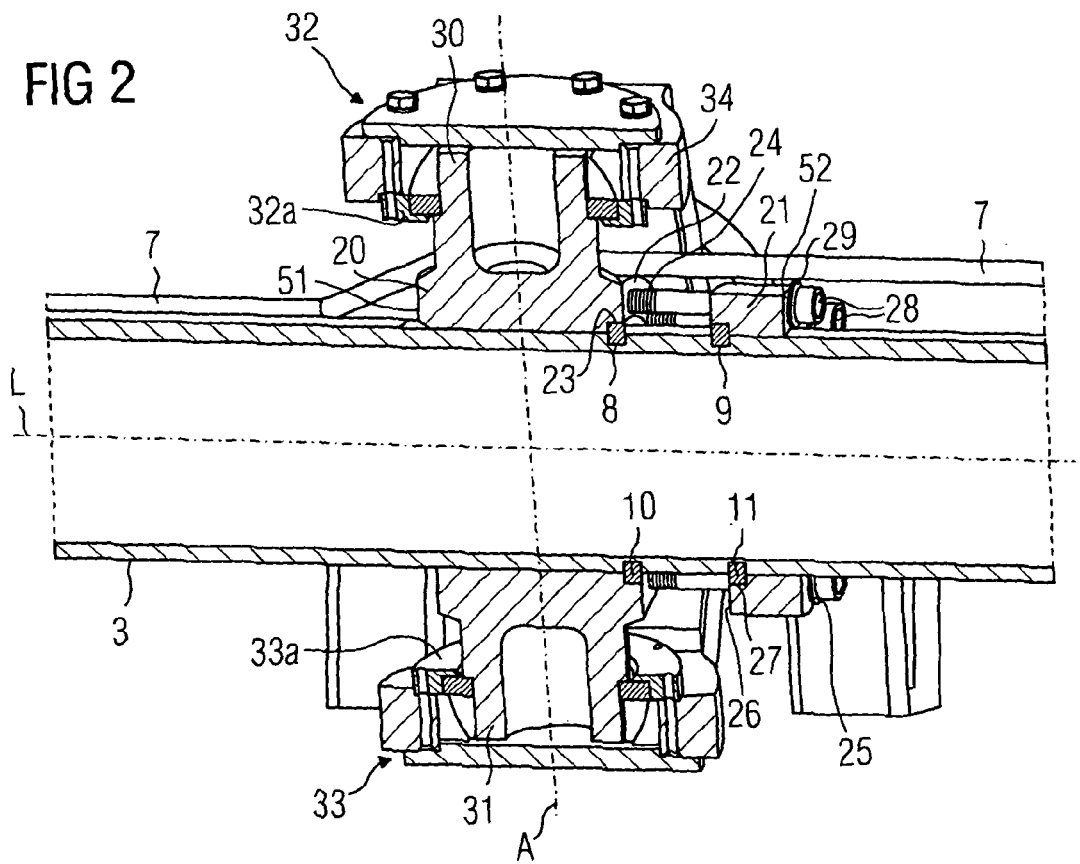
FIG. 2 shows partially a sectional view of the device of FIG. 1.

The hydraulic pitch cylinder 1 comprises a tube 3, a piston rod 4 with a flange 5 at its free end and in a common way connectors 6 as well as conduits 7 for feeding and draining off hydraulic fluid. The piston rod 4 is hydraulically movable relatively to the tube 3. In case of the present embodiment of the invention the tube 3 is substantially a cylindrical tube wherein the cylindrical tube 3 comprises two grooves 8, 9 on its outside in a certain applicable distance from each other. FIG. 2 shows the arrangement of the grooves 8, 9 relatively to each other. The groove 8 is a receptacle for a first stop ring 10 and the groove 9 is a receptacle for a second stop ring 11. In case of the present embodiment both stop rings 10 and 11 are made of a metal and are appropriately arranged in the respective groove 8, 9. Thus there is substantially no free space between a stop ring and a wall of a groove and thus substantially no movement of a stop ring within a groove. The stop rings 10 and 11 project above the tube 3 and are stoppers for parts of the fixing device 2.

The fixing device 2 comprises a first ring-like element 20 and a second ring-like element 21. The first ring-like element 20 is arranged at the tube 3 in particular around the tube 3 wherein the tube 3 is slightly pressed into the first ring-like element 20 comparable with a slight press fit. The first ring-like element 20 is thereby a kind of support ring having a side 22 with a L-shaped flute 23. The dimensions of the L-shaped flute 23 are such that the part of the stop ring 10 projecting above the tube 3 is appropriately arranged in the flute 23. Thus the first ring-like element 20 is supported towards the stop ring 10 operating as a stopper for the first ring-like element 20. Additionally the first ring-like element 20 comprises in the side 22 around its perimeter several screw holes 24. The screw holes 24 are substantially parallel to a longitudinal axis L of the tube 3.

The second ring-like element 21 is a kind of fixing ring, holding ring or holding mechanism and is also arranged at the tube 3 in particular around the tube 3. The second ring-like element 21 comprises several clearance holes or through borings 25 around its perimeter and a side 26 having a L-shaped flute 27. The clearance holes or through borings 25 are substantially parallel to the longitudinal axis L of the tube 3. The dimensions of the L-shaped flute 27 are such that the part of the stop ring 11 projecting above the tube 3 is appropriately arranged in the flute 27. Thus the second ring-like element 21 is supported towards the stop ring 11 operating as a stopper for the second ring-like element 21. Thereby the side 22 of the first ring-like element 20 and the side 26 of the second ring-like element 21 face each other.

After the attachment of the first ring-like element 20 and the second ring-like element 21 around the tube 3 what is by the way done e.g. before the connectors 6 and conduits 7 are mounted several screws or bolts 28 with snap rings 29 are used which press the first 20 and the second 21 ring-like element in such a way towards the respective stop ring 10, 11 that the fixing device 2 and the tube 3 are substantially non-relocatable relatively to each other. Thereby each bolt 28 is arranged in a through boring 25 of the second ring-like element 21 and screwed in one screw hole 24 of the first ring-like element 20. By tightening the bolts 28 the first ring-like element 20 is pressed towards the stop ring 10 and the second ring-like element 21 is pressed towards the stop ring 11.

The first ring-like element 20 comprises additionally two projecting parts 30, 31 facing each other. At each projecting part 30, 31 a bearing 32, 33 is arranged. Thus the hydraulic pitch cylinder 1 can be pivoted around a first bearing shaft A or a first axis A. In case of the present embodiment the bearings 32 and 33 are plain bearings. The bearing part 32a of the bearing 32 and the bearing part 33a of the bearing 33 are attached to a third ring-like element 34. The third ring-like element 34 substantially surrounds the first ring-like element 20 wherein the space between the first ring-like element 20 and the third ring-like element 34 is such that the hydraulic pitch cylinder 1 can pivot in a sufficient way around the bearing shaft A.

Attached to the third ring-like element 34 are two further bearings 35, 36 allowing the hydraulic pitch cylinder 1 to be pivoted around a second bearing shaft B or a second axis B which is substantially perpendicular to the first bearing shaft A. In case of the present embodiment of the invention the bearings 35, 36 are also plain bearings.

At the static parts 37 of the bearings 35, 36 are attached fixing means in form of flanges 38. Each flange 38 comprises a clearance hole or through boring 39. By means of the flanges 38 and not shown screws or bolts the device D comprising the fixing device 2 and the hydraulic pitch cylinder 1 can be attached in particular screwed at a hub 40 of a wind turbine as can be seen from FIG. 3 and FIG. 4.

Figure 5:
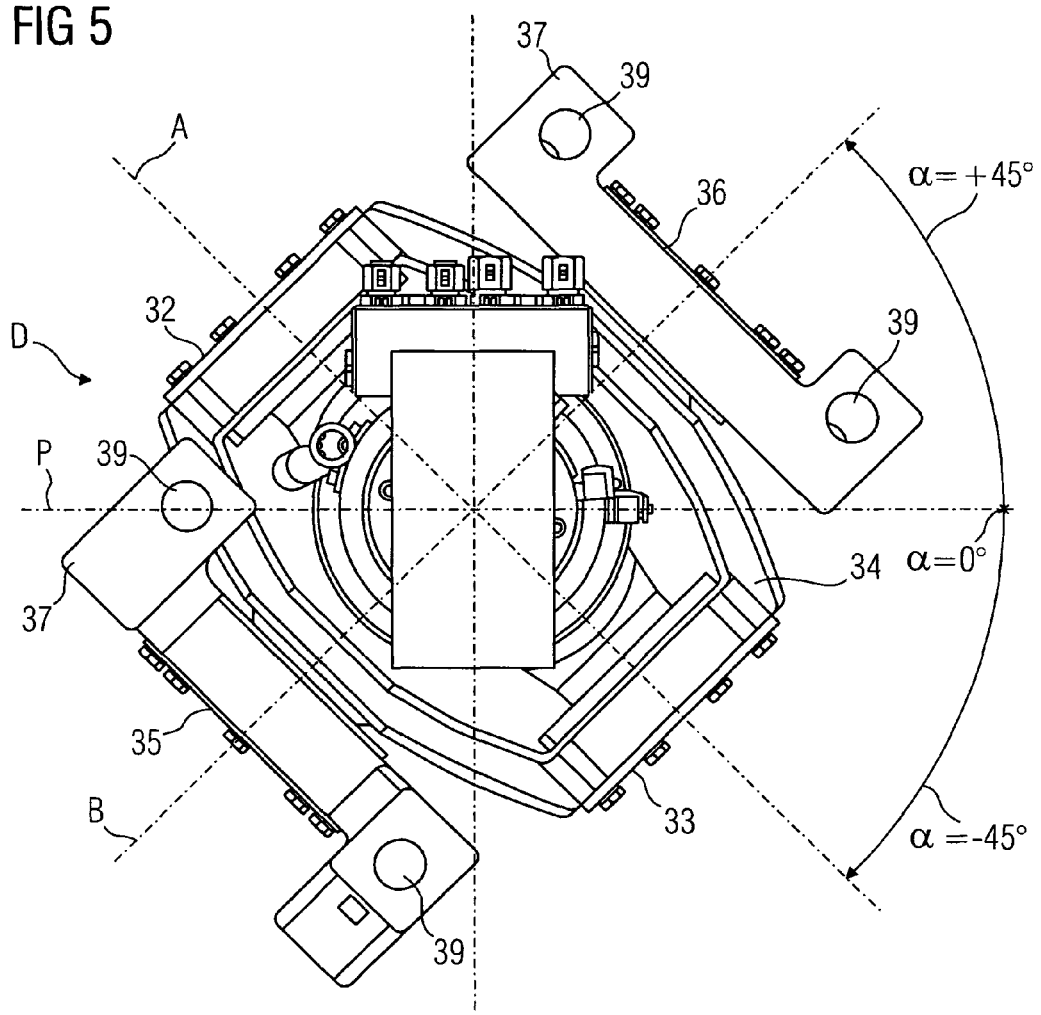
FIG. 5 shows tilt angles of bearing shafts of the device.

In case of the present embodiment of the invention the flange 5 of the piston rod 4 of the hydraulic pitch cylinder 1 is connected to a moving part 41 of the hub 40 in form of a rotatable plate 41 defining an adjusting plane P. The rotatable plate 41 is connected to a rotor blade of a wind turbine. The other end of the hydraulic pitch cylinder 1 is arranged through an opening of the hub 40 and is arranged in a housing 42. The device D is in such a way arranged or fastened at the hub 40 by means of the flanges 38 and not shown screws or bolts that the first bearing shaft A and the second bearing shaft B are arranged respectively under a certain tilt angle a relatively to the adjusting plane P and the rotatable plate 41 respectively. This situation is explicitly shown in FIG. 5. As can be seen from FIG. 5 the device D is compared with the known, initially mentioned arrangement of the bearing shafts tilted about approximately 45° relatively to the adjusting plane P and the rotatable plate 41 respectively. Thus the angular or circular rotation during the adjustment of the pitch is divided substantially equally on both bearing shafts A and B. In this manner the load can be divided on the bearings substantially equally. As can further be seen from FIG. 5 in case of the present embodiment of the invention the first and the second bearing shaft A, B are arranged substantially perpendicularly relatively to each other and are arranged substantially in a common plane.

Figure 3:
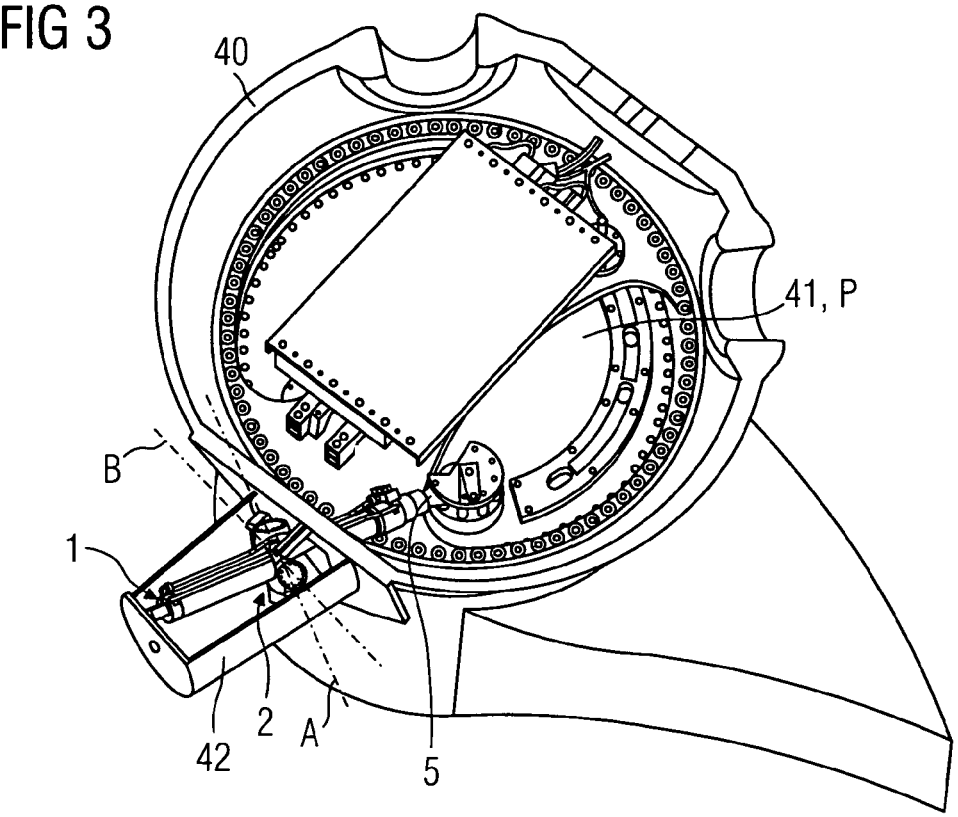
FIG. 3, 4 shows the device of FIG. 1 attached to a hub in two different operation positions.
Figure 4:
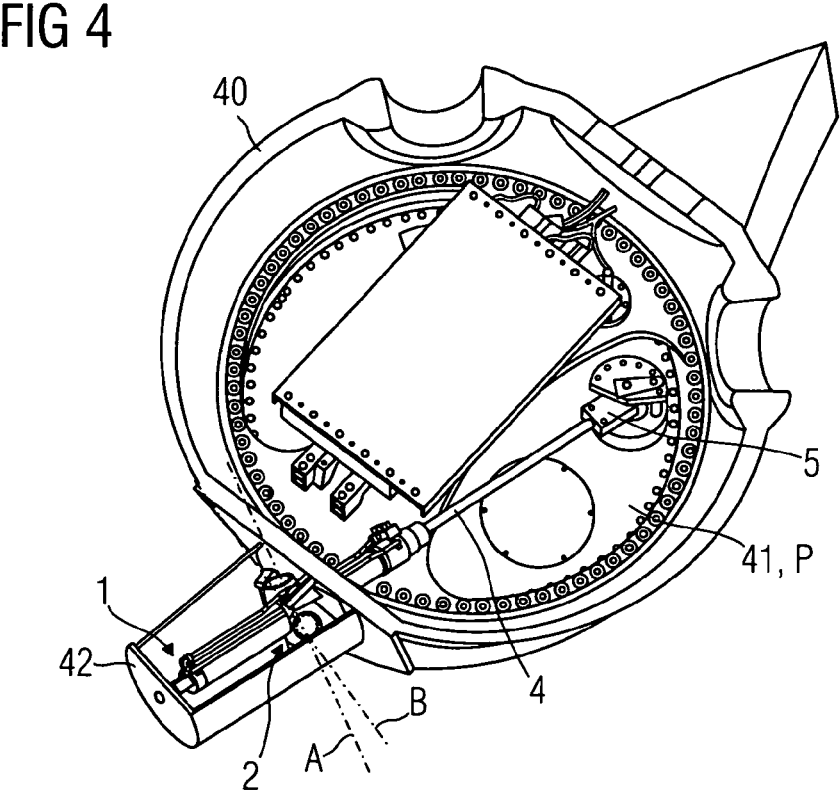

FIG. 3 shows a first operating position of the hydraulic pitch cylinder 1 in particular of the piston rod 4 in which the pitch of the rotor blade is minimal. When the piston rod 4 is adjusted relatively to the tube 3 the pitch can be adjusted respectively. Thereby the hydraulic pitch cylinder 1 pivots around the bearing shafts A and B. Thus the fixing device 2 is a kind of pendulum bearing support of the hydraulic pitch cylinder 1 attachable to a hub of a wind turbine. In FIG. 4 the maximum pitch is shown.

According to another embodiment of the device D the attachment of the device D per se at the hub 40 can be unchanged compared with the known and initially mentioned arrangement what means that the device D is not tilted relatively to the adjusting plane P and the rotatable plate 41 respectively. In this case the construction of the fixing device 2 in particular the arrangement of the bearings 32, 33 and 35, 36 at the fixing device 2 must be respectively adapted to receive tilted bearing shafts A and B relatively to the adjusting plane P and the rotatable plate 41 respectively to divide the angular or circular rotation during the adjustment of the pitch substantially equally on both bearing shafts A and B.

Furthermore the tilt angel of the first bearing shaft A needs not to be −45° and the tilt angle of the second bearing shaft B needs not to be +45° relatively to the adjusting plane P and the rotatable plate 41 respectively. In fact the tilt angle of the first bearing shaft A can be chosen in the range of +10° to +80° or in the range of −10° and −80°. Also the tilt angle of the second bearing shaft B can be chosen in the range of +10° to +80° or in the range of −10° and −80°. As a rule the tilt angles of the first and the second bearing shafts A, B are chosen such that the angular or circular rotation and/or the loads of the hydraulic pitch cylinder 1 are divided preferably substantially equally onto all bearings 32, 33, 35, 36.

By the way the first and the second bearing shaft need not to be arranged substantially perpendicularly to each other or substantially in a common plane.

Figure 6:
FIG. 6 shows a cramp.

According to an alternative embodiment of the device D the first ring-like element 20 and the second ring-like element 21 can be pressed towards the respective stop ring 10, 11 by at least one cramp 50 e.g. as shown in FIG. 6. As a rule several cramps 50 are used. In this case the first ring-like element 20 and the second ring-like element 21 can have instead of the clearance holes, through borings or screw holes one or more slots around their perimeter in the sides 51, 52 which receive respectively at least one end of a cramp 50. Thus the cramps 50 e.g. made of an elastic material press the first ring-like element 20 and the second ring-like element 21 towards the respective stop ring 10, 11.

Figure 7:
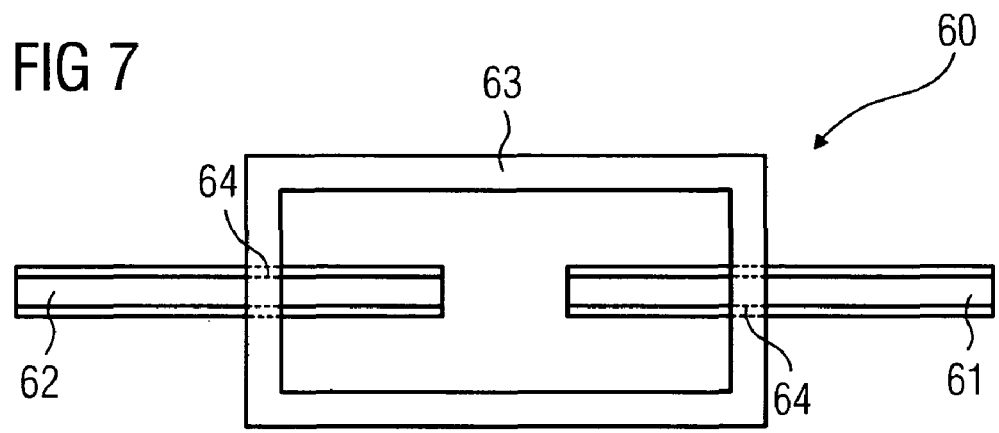
FIG. 7 shows a spreader and FIG. 8 shows schematically a tube having a projection.

According to a further embodiment of the device D the stop ring 10 can be arranged at the side 51 of the first ring-like element 20 and the stop ring 11 can be arranged at the side 52 of the second ring-like element 21 in respective not shown grooves. In this case at least one spreader 60 e.g. as shown in FIG. 7 is used between the side 22 of the first ring-like element 20 and the side 26 of the second ring-like element 21. The spreader of FIG. 7 comprises two screws 61, 62 and a retainer 63 with screw threads 64. By turning the retainer 63 in a certain direction the screws 61, 62 move out of the retainer 63. With such spreaders 60 the first ring-like element 20 can be pressed towards its stop ring and the second ring-like element 21 can be pressed towards its stop ring.

Figure 8:
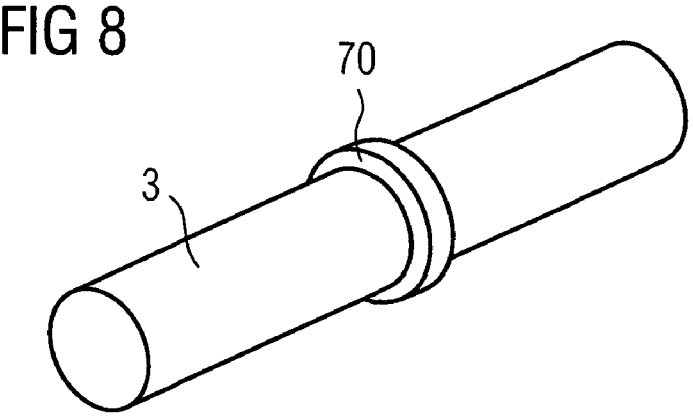

By the way a stopper needs not to be a stop ring. The stopper can also be a projection e.g. a ring-like projection 70 on the outside of the tube 3 as schematically shown in FIG. 8. Thereby both stoppers can be a stop ring, both stoppers can be a projection or one stopper can be a stop ring and the other stopper can be a projection.

Furthermore the pitch actuator needs not to be a hydraulic pitch cylinder. The pitch actuator can also be an electric pitch actuator.

In addition in particular the contours of the outside of the tube and the inside of the first ring-like element and of the second ring-like element need not to be substantially roundly. It is also possible that the contours comprise edges or other forms as long as they fit.

Preferably a device D according to the invention is assigned to each rotor blade of a wind turbine.

The device D needs thereby not to be connected to a plate 41. The device D can also be connected to another element connected to a rotor blade of a wind turbine.

Unlike as described before the device D can also be attached or fastened at a rotor blade of a wind turbine. In this case the flange 5 is attached e.g. to a fixed plate or another fixed element of a hub defining an adjusting plane. If the device D is operated the piston rod 4 moves out of the tube 3 wherein the rotor blade is pivoted relatively to the hub.

By the way each rotor blade is pivoted in a common way relatively to the hub.

The described embodiments of the inventions are only examples. In particular hybrids of the embodiments are without any qualification within the scope of the invention.

The invention refers also to a wind turbine comprising a hub, at least one rotor blade and a described device for the adjustment of the pitch of the rotor blade.

The invention claimed is:

1. A device for the adjustment of the pitch of a rotor blade of a wind turbine, comprising:
   a pitch actuator acting on a pitch adjusting plane at a hub of the wind turbine; and
   a fixing device to which the pitch actuator is attached, and said fixing device is provided for an attachment to the hub,
   wherein the fixing device comprises a first and a second bearing shaft allowing a pendulum motion of the pitch actuator relatively to the fixing device, and
   wherein both the first and the second bearing shaft are arranged respectively under a certain tilt angle relatively to the adjusting plane, wherein said tilt angle is respectively substantially different from 0° or 90°.

2. The device according to claim 1, wherein the pitch actuator is a hydraulic pitch cylinder or an electric pitch actuator.

3. The device according to claim 1, wherein the first and the second bearing shaft are arranged substantially perpendicularly relatively to each other.

4. The device according to claim 1, wherein the first and second bearing shaft are arranged substantially in a common plane.

5. The device according to claim 1, wherein the first and/or the second bearing shaft are arranged substantially under a tilt angle within the range of +10° to +80° or −10° to −80° relatively to the adjusting plane.

6. The device according to claim 1, wherein the first or the second bearing shaft are arranged substantially under a tilt angle within the range of +10° to +80° or −10° to −80° relatively to the adjusting plane.

7. The device according to claim 1, wherein the first bearing shaft is arranged substantially under a −45° tilt angle relatively to the adjusting plane and wherein the second bearing shaft is arranged substantially under a +45° tilt angle relatively to the adjusting plane, wherein an angular rotation of the pitch actuator is divided equally on both of the bearing shafts.

8. The device according to claim 1, wherein at least two bearings are assigned to the first bearing shaft wherein the two bearings of the first bearing shaft are attached to a ring element of the fixing device.

9. The device according to claim 1, wherein at least two bearings are assigned to the second bearing shaft wherein the two bearings of the second bearing shaft are attached to a ring element of the fixing device connected respectively to a bearing part of the bearings of the first bearing shaft.

10. The device according to claim 1, wherein at least one bearing is a plain bearing.

11. The device according to claim 1, wherein the fixing device comprises a flange.

* * * * *